United States Patent [19]

Kishi et al.

[11] Patent Number: 4,660,148
[45] Date of Patent: Apr. 21, 1987

[54] PART PROGRAM CREATION METHOD

[75] Inventors: Hajimu Kishi; Masaki Seki, both of Tokyo, Japan

[73] Assignee: Fanuc Ltd, Minamitsuru, Japan

[21] Appl. No.: 642,685

[22] PCT Filed: Dec. 21, 1983

[86] PCT No.: PCT/JP83/00448
§ 371 Date: Aug. 14, 1984
§ 102(e) Date: Aug. 14, 1984

[87] PCT Pub. No.: WO84/02591
PCT Pub. Date: Jul. 5, 1984

[30] Foreign Application Priority Data

Dec. 29, 1982 [JP] Japan ................................. 57-228511

[51] Int. Cl.$^4$ ............................................ G05B 19/403
[52] U.S. Cl. ..................................... 364/474; 364/188
[58] Field of Search ................................. 364/188-192, 364/171, 474

[56] References Cited

U.S. PATENT DOCUMENTS

| 4,042,866 | 8/1977 | Morita et al. | 318/568 |
| 4,152,765 | 5/1979 | Weber | 364/191 |
| 4,328,550 | 5/1982 | Weber | 364/192 |
| 4,490,781 | 12/1984 | Kishi et al. | 364/191 |
| 4,519,026 | 5/1985 | Nozawa et al. | 364/189 |

Primary Examiner—Jerry Smith
Assistant Examiner—Allen MacDonald
Attorney, Agent, or Firm—Staas & Halsey

[57] ABSTRACT

A part program creation method for creating an NC part program comprising a graphic definition statement defining a graphic (MFIG), a motion definition statement defining motion of a tool (TL), and auxiliary machining information such as feed velocity and spindle rotational velocity, the method having steps of storing in a memory along with respective graphic identifiers, motion definition statements conforming to respective ones of the graphics, entering a graphic identifier and defining the graphic (MFIG) by specifying a point ($P_1$), straight lines ($S_1$-$S_4$) and circular arcs, and creating a part program by combining the motion definition statement, which corresponds to the entered graphic identifier, and the defined graphic definition statement.

5 Claims, 13 Drawing Figures

PART PROGRAM CREATION METHOD

BACKGROUND OF THE INVENTION

This invention relates to a part program creation method through which a part program necessary for the creation of an NC tape can be simply created. More particularly, the invention relates to a method of creating a complete part program merely by storing the non-variable portions of a part program in a memory beforehand and then entering the variable portions of the part program.

An NC machine tool is operated as specified by machining program data (NC data) stored on an NC tape to subject a workpiece to prescribed machining. To create an NC tape for a certain cutting operation, numerical control information and other machining conditions are punched into a paper tape in accordance with predetermined rules. The numerical control information includes all the information necessary for machining, such as numerical values obtained from a design drawing and relating to the dimensions of the workpiece that is to be machined, feed velocity, and the like. When machining the workpiece by means of an NC machine tool, the NC tape is loaded into the tape reader of an NC device so that the various instructions recorded on the NC tape may be read successively, the NC device responds by executing the instructions to perform the prescribed machining. Thus, an NC tape is a record of NC data, and comprises, for example, a paper tape, magnetic tape or bubble cassette memory. Since considerable time and experience is required to create the NC tape, an apparatus for creating an NC tape automatically has recently been developed and put into practical use. This NC tape automatic creation apparatus includes a graphic display, keyboard, printer and the like and is extremely useful in preparing NC tapes in a simple, accurate and rapid manner. This NC tape automatic creation apparatus includes a microprocessor and an internal main memory for storing the NC tape creation software (system program).

To create an NC tape by such an NC tape automatic creation apparatus, the prescribed system program is loaded into the main memory, and a group of data (part program) specifying motion of a tool along a contour must be created and entered in accordance with predetermined rules. The part program ordinarily comprises a graphic definition state for defining a graphic, a motion definition statement (motion statement) specifying tool path, and auxiliary machining information such as feed velocity and spindle rotating velocity, and a programmer must create the part program at his desk from a design drawing. Therefore, such creation of a part program is disadvantageous in that it is both a troublesome and time-consuming task and can only be accomplished by a programmer having considerable programming skill.

SUMMARY OF THE INVENTION

Accordingly, an object of the present invention is to provide a part program data creation method through which even a beginner can readily create a part program in a simple manner.

Another object of the present invention is to provide a part program data creation method through which a complete part program can be created merely by storing the non-variable portions (motion definition statements and the like) of a part program in a memory beforehand and then entering the variable portions (graphic definition statements and the like) of the part program.

The present invention is a part program creation method for creating an NC part program comprising a graphic definition statement defining a graphic, a motion definition statement defining a tool path, and auxiliary machining information such as feed velocity and spindle rotational velocity. The method includes steps of completing a program, from which a graphic definition statement is excluded and which comprises a motion definition statement and auxiliary machining information, storing the program in a memory, defining a graphic by a graphic input device, and creating a part program by combining the defined graphic definition statement and the program, which has been registered in advance. According to the present invention, a part program can be created merely by designating a prescribed program from among a plurality of programs (motion definition statements and the like) registered in a memory, followed by defining a graphic. Since it is unnecessary to define a motion statement for each and every part program, a part program can be created simply and in a short time even by a beginner.

DESCRIPTION OF THE PREFERRED EMBODIMENT

Figures 1, 2:
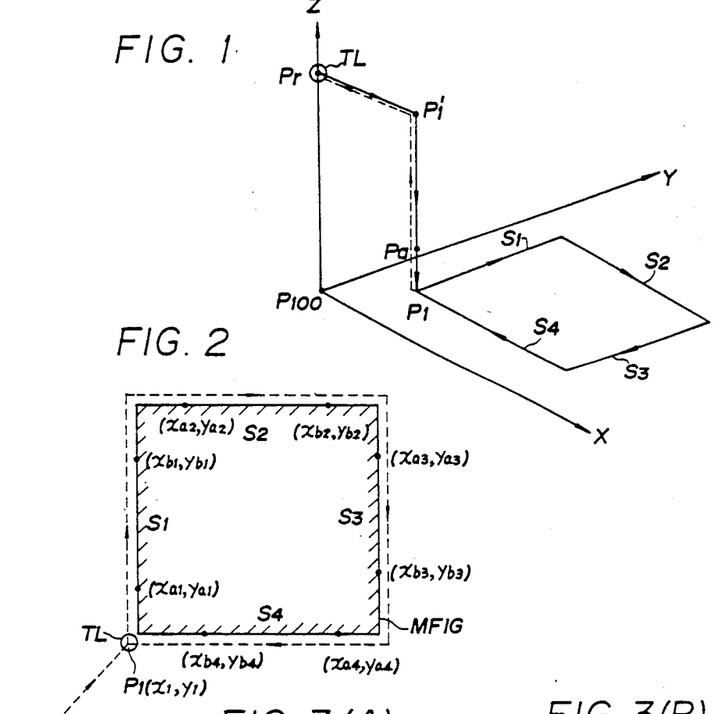
FIGS. 1, 2 and 3(A) and 3(B) schematically illustrate part program generation according to the present invention.

FIGS. 1 and 2 are schematic views for describing the present invention. FIG. 1 illustrates a tool path expressed in a three-dimensional coordinate system, and FIG. 2 shows a tool path obtained by projecting the abovementioned tool path on an XY plane. Assume that travels along a path as follows. First a tool TL is moved from a reference point $P_r$ (where $P_{100}$ is the point obtained by projecting the reference point on the XY plane), as shown in FIG. 1, to a point $P_1'$ in a rapid-traverse mode. Next the tool is moved to an approach point $P_a$ at a velocity F0100 (where F is a word address word indicating feed velocity) and at a spindle rotational velocity S1500 (where S is a word addres word indicating spindle rotational velocity). Next the tool is moved to a machining starting point $P_1$ at a cutting velocity F0050 while the spindle is rotating, and thereafter to the point $P_1$ along straight lines $S_1 \rightarrow S_2 \rightarrow S_3 \rightarrow S_4$ at the abovementioned cutting velocity (F0050) and spindle rotational velocity (S1500). After completing machining the tool is moved back to the reference point $P_r$ in the rapid-traverse mode along the path $P_1 \rightarrow P_1' \rightarrow P_r$. The part program for such movement is as shown below, which assumes that the distance between the approach point $P_a$ and the reference point $P_r$ along the Z axis is 40, and that the Z-axis coordinate value of the reference point $P_r$ is 50:

| | |
|---|---|
| $P_1 = x_1, y_1$ | (a) |
| $S_1 = xa_1, ya_1; xb_1, yb_1$ | (b) |
| $S_2 = xa_2, ya_2; xb_2, yb_2$ | (c) |
| $S_3 = xa_3, ya_3; xb_3, yb_3$ | (d) |
| $S_4 = xa_4, ya_4; xb_4, yb_4$ | (e) |
| FROM, $P_{100}$, 50A; | (f) |
| RPD, $P_1$; | (g) |
| DLT, $-40$, F0100, S1500; | (h) |
| DLT, $-10$, F0050; | (i) |
| $S_1$; | (j) |
| $S_2$; | (k) |
| $S_3$; | (l) |
| $S_4$; $P_1$; | (m) |
| RPD, DLT, 50; | (n) |
| RPD, $P_{100}$ | (p) |
| M02; | (q) |

In the above, (a) through (e) constitute a graphic definition statement which, by specifying the point $P_1$ and straight lines $S_1$ through $S_4$, defines a machining graphic MFIG (see FIG. 2). Further, (f) through (q) constitute a motion definition statement, in which F0100, S1500 and F0050 in (h) and (i) are items of auxiliary machining information indicative of cutting velocity and spindle rotational velocity. "RPD" signifies rapid traverse, the numerical value following "DLT" signifies an incremental value along the Z axis, and M02 signifies program end.

Ordinarily, the foregoing graphic definition statement and motion definition statement (inclusive of the auxiliary machining information) are sequentially created by a programmer and combined to form a part program.

Figure 3:
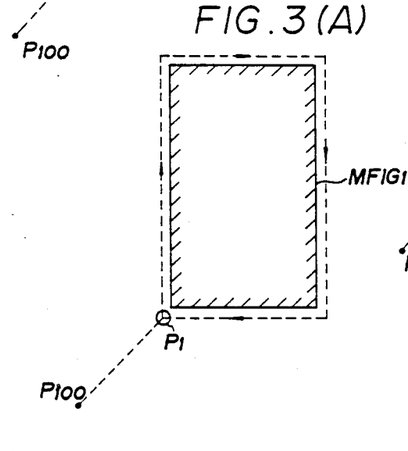

When creating part programs that, like the graphics MFIG$_1$, MFIG$_2$ shown in the respective FIGS. 3(A), (B), have shapes different from that of the graphic MFIG of FIG. 2, but are similar thereto in that the shapes are quadrangles, the graphic and motion definition statements must be created for each and every graphic if the conventional method is used. However, upon careful observation, one notices that the motion definition statements [(f)–(q)] for similarly shaped graphics having different dimensions, are exactly the same. This holds providing that the path from the reference point $P_r$ to the machining starting point $P_1$ is the same as the path going in the opposite direction.

Therefore, according to the present invention, which is based upon the foregoing fact, a variety of motion definition statements are stored in memory with an identifier assigned to each one. To create a part program only a graphic definition statement is created, a predetermined motion definition statement is called, and the created graphic definition statement and the called motion definition statement are combined to form a part program.

Further, upon observing graphic definition statements for similar shapes which are different dimensions, one notices that the arrangement of the symbols representing the points, straight lines and circular arcs are the same, with only the dimension data being different. Therefore, according to the present invention, the symbols representing the points, straight lines and circular arcs used to create a graphic definition statement. are defined, but the data specifying these points, straight lines and circular arcs is left unspecified. Incomplete part programs comprising such graphic definition statements and motion definition statements are stored in memory for each shape. The data specifying the aforementioned points, straight lines and circular arcs is entered, and the predetermined part program is called to create a complete part program.

Figure 4:
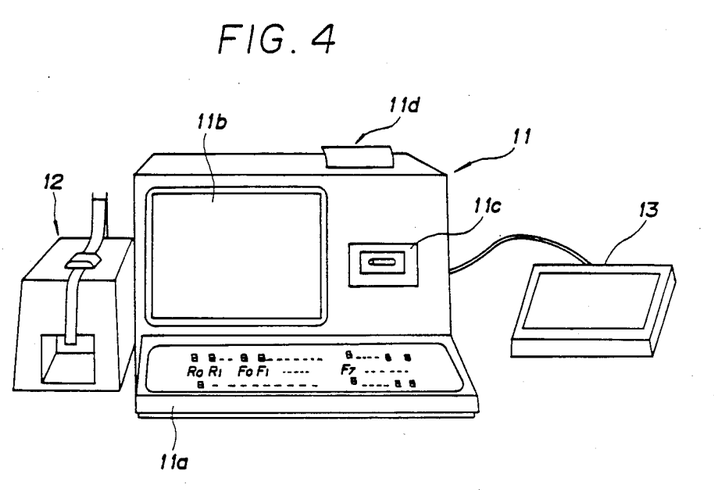
FIG. 4 is a view showing the external appearance of an NC tape automatic creation apparatus.

FIG. 4 is an external view of an NC tape automatic creation apparatus. In FIG. 4, numeral 11 denotes the main body of an apparatus for creating NC data. The main body 11 has a keyboard 11a having a multiplicity of keys, a graphic display device 11b, a cassette magnetic tape 11c, a printer 11d, and a control unit (not shown). The latter comprises a microcomputer which executes processing (1) for input/output operation, (2) for digitizing and (3) for the creation of a part program, by means of a tablet which is described below. The microcomputer is controlled by a system program stored in means such as a ROM. The multiplicity of keys provided on the keyboard 11a are used to respond to prompts, to designate system program loading, and to enter NC data, etc. The graphic display device 11b displays, in graphical form, coordinate values obtained by digitization of positions designated by the tablet, as well as input data, numerical values, NC data and various messages for conversational operation of the system. The magnetic tape cassette 11c is used to enter a system program into the main body of the NC data creating apparatus.

By way of example, when using a tablet to enter coordinate values directly from a drawing and to prepare a part program, the software (system program) for digitizing processing, which is contained in the cassette magnetic take 11c, must be read into the main body of the apparatus. To read the magnetic tape, all that need be done is to touch a load button on the keyboard 11a after the tape has been set.

The printer 11d prints out characters which appear on the screen of the graphic display device 11b, the contents punched in a paper tape, described later, and information which has been written into the magnetic tape. Numeral 12 denotes a paper tape reader/puncher for preparing an NC tape by punching a paper tape with the NC data prepared by the NC data creating apparatus 11, and for reading NC or other data which has already been punched into an NC tape. Numeral 13 denotes a tablet device which, through use of a cursor or stylus, is operable to input positions on a drawing, which is laid on the tablet, into the NC data creating apparatus 11.

Figure 5:
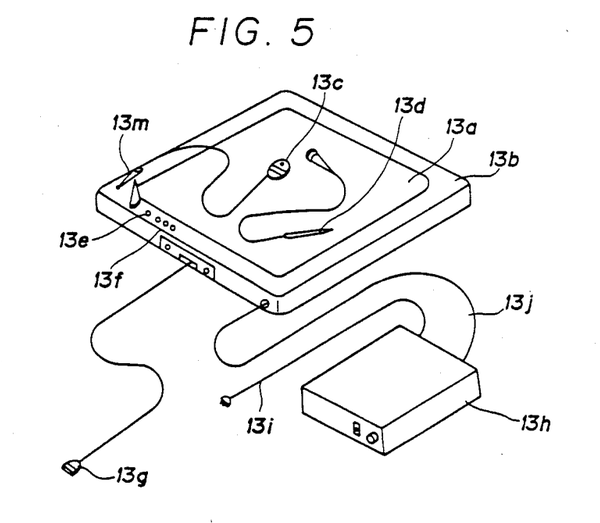
FIG. 5 is a perspective view showing the external appearance of a tablet device.

FIG. 5 is a perspective view showing the external appearance of of the tablet device 13. Numeral 13a denotes the tablet proper, numeral 13b denotes a table cover, numeral 13c identifies a cursor, numeral 13d identifies a stylus pen, numeral 13e denotes a buzzer, numeral 13f denote lamps for indicating, e.g., coordinate input mode and introduction of power, numeral 13g indicates an input/output connector for connecting the tablet device 13 to the NC data creating apparatus 11, numeral 13h identifies a power unit for supplying the tablet proper 13a with D.C. power, numeral 13i denotes an A.C. cable, numeral 13j identifies a D.C. cable, and numeral 13m identifies a pen stand for the stylus pen.

Figure 6:
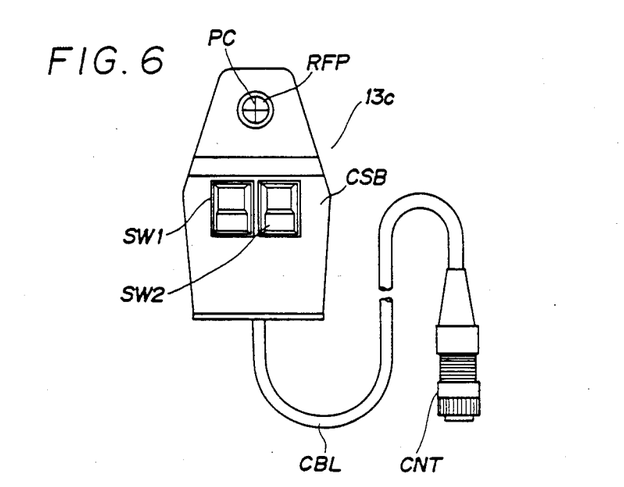
FIG. 6 is an enlarged view of a cursor unit, which is one element of the FIG. 5 tablet device.

The cursor 13c or stylus pen 13d is used to enter coordinates and other data. FIG. 6 is an enlarged view of the cursor, which has a cursor body CSB, first and second switches SW1, SW2, a reading focal point RFP, a connector CNT and a cable CBL. To enter coordinates, the intersection Pc of the cross hairs provided on the reading focal point RFP is aligned with a point on a drawing that is desired to be entered, followed by depressing the first switch SW1 or second switch SW2.

Figure 7:
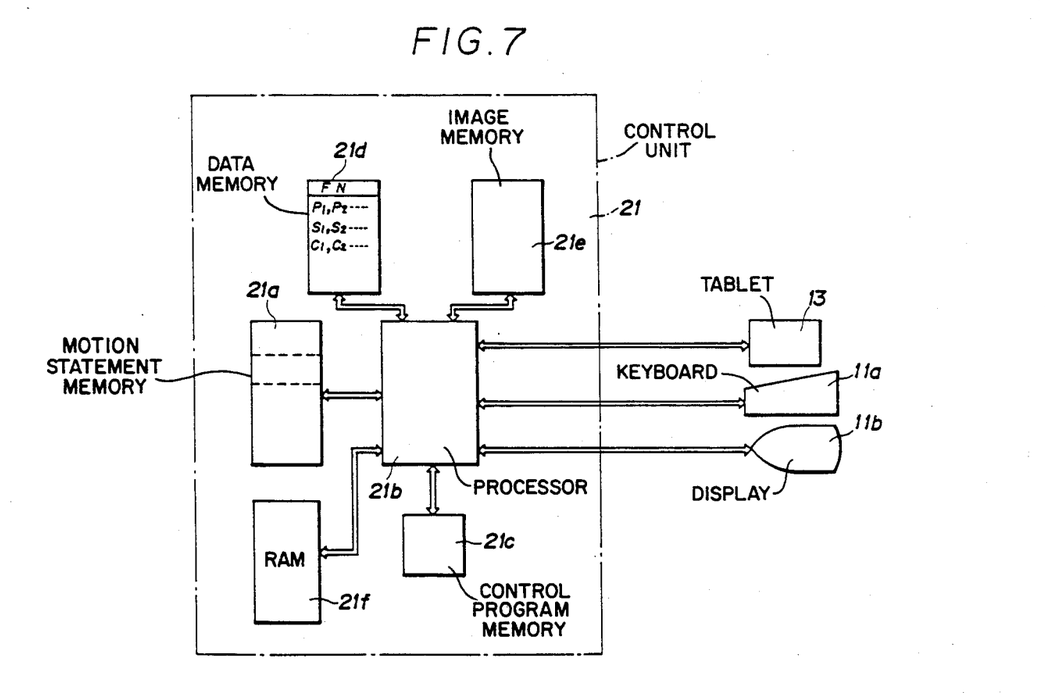
FIG. 7 is a block diagram of an apparatus embodying the part program creation method of the present invention.

FIG. 7 is a block diagram of an apparatus embodying the part program creation method of the present invention. Portions similar to those shown in FIG. 4 are designated by like reference characters. A control unit 21 incorporated within the apparatus 11 includes a motion statement memory 21a for storing motion definition statements conforming to each of a variety of shapes (path patterns) on the XY plane, along with the identifiers (graphic identifiers) of the statements. The apparatus 11 also includes a processor 21b for executing various processing such as (1) processing for data input/output among data input/output devices such as the keyboard 11a, display unit 11b and tablet 13, (2) processing for digitizing, (3) part program creation processing and (4) NC tape creation processing. The following memories are included in apparatus 11, a control program memory 21c storing a control program which controls the various processes, a data memory 21d, an image memory 21e for storing image information relating to path patterns corresponding to respective ones of the motion statements stored in the motion statement memory 21a, and a memory (RAM) 21f for storing a created part program and NC data.

Figure 12:
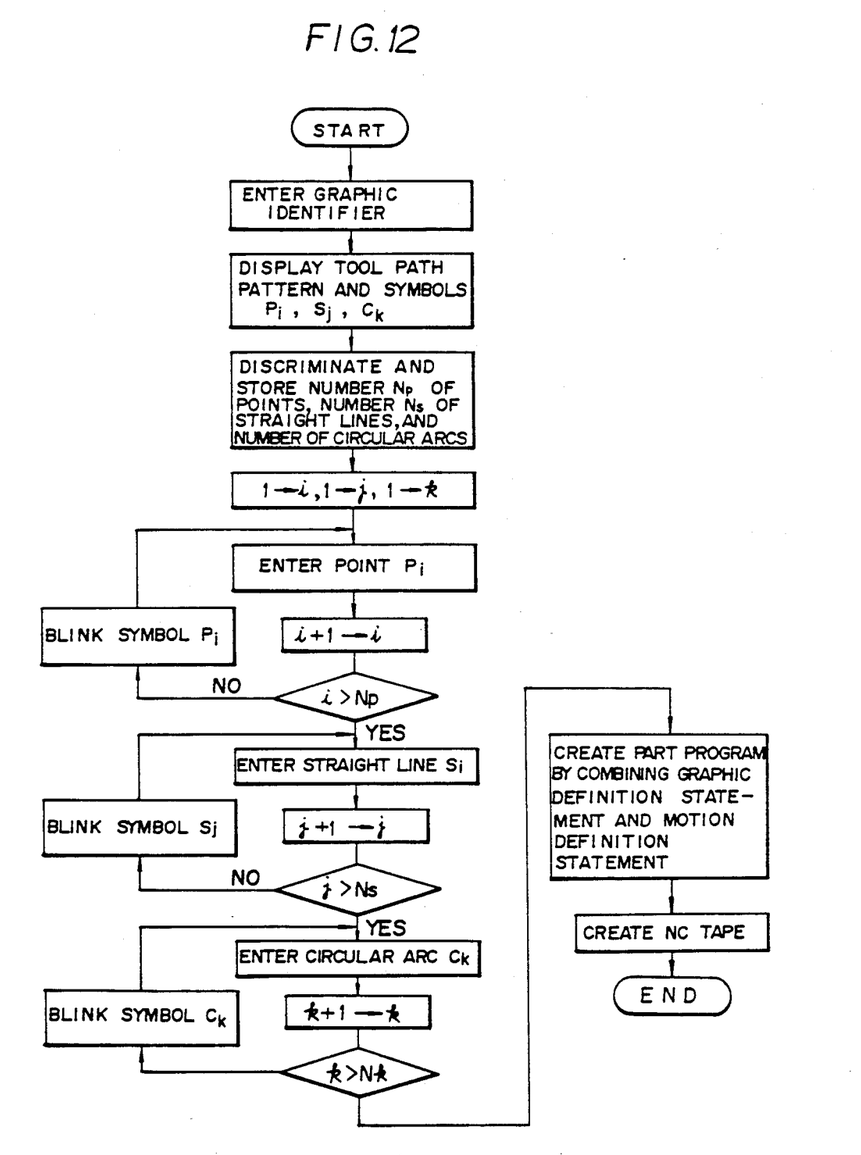
FIG. 12 is a flowchart of processing according to the present invention.

The procedure for part program creation according to the present invention will now be described in conjunction with the flowchart of FIG. 12.

Figure 8:
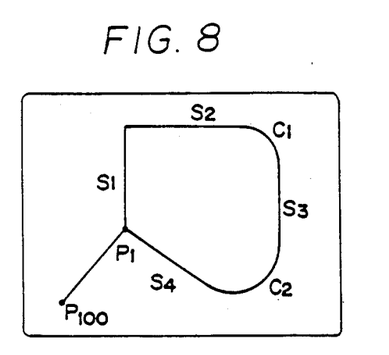
FIG. 8 shows an image displayed on the screen of a CRT.

First, a graphic identifier FN of a graphic for which a part program is desired to be created is entered from the keyboard 11a. When the graphic identifier FN has been entered, the processor 21b stores the identifier in the data memory 21d, reads the image information for the path pattern corresponding to the graphic identifier out of the image memory 21e, and applies the information to the graphic display unit 11b. As a result, the graphic display unit displays, on a cathode-ray tube (CRT), a tool path pattern in the XY plane in predetermined dimensions, as shown in FIG. 8, as well as symbols $P_i$ (i=1, 2, ...), $S_i$ (i=1, 2, ...), $C_i$ (i=1, 2 ...) representing points, straight lines and circular arcs respectively, these symbols being displayed close to the corresponding points, straight lines and circular arcs, as shown in FIG. 8.

Thereafter, data specifying the points $P_i$, straight lines $S_i$ and circular arcs $C_i$ is entered sequentially from the tablet 13. Next, before describing the method of entering this data, point input, straight line input and circular arc input methods will be set forth.

Figure 9:
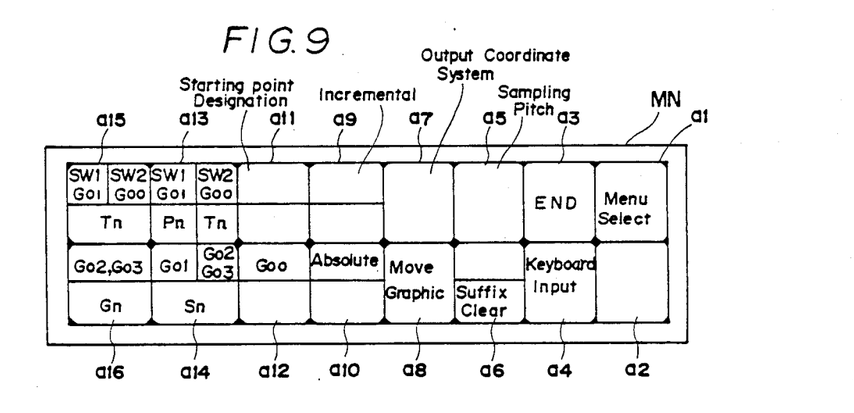
FIG. 9 is a view of a menu.

Since the tablet device 13 has the capability of recognizing the positions of points designated on the tablet surface, the tablet device 13 can be provided with a switch function if a portion of the tablet surface is divided into a plurality of areas and each area is assigned a meaning. For example, if it is decided that a certain area is to be an absolute command area, absolute NC data will be created by designating this area. Accordingly, in the present invention, a strip of paper printed with the menu shown in FIG. 9 is affixed to the tablet and, by designating a prescribed area on the menu, various modes can be selected, namely: (1) a point definition statement creation mode, (2) a point sequence connection statement creation mode, (3) a straight line definition statement creation mode, and (4) a circular arc definition statement creation mode. Specifically, in FIG. 9, area $a_1$ is a menu selection area. The areas $a_{13}$, $a_{14}$, $a_{15}$, $a_{16}$ are mode selection areas. The menu selection area $a_1$ must always be designated before selecting a new mode. The area $a_{13}$ is an area designated to select the mode for creation of the point/point sequence connection statement. The area $a_{14}$ designates the mode for creation of the straight line definition statement, the area $a_{15}$ designates the mode for creation of the point sequence connection statement, and the area $a_{16}$ designates the mode for creation of the circular arc definition statement.

The mode for creation of the point/point sequence connection statement is a mode in which points are entered one at a time to produce, as outputs, a point graphic definition statement and a point-sequence graphic definition statement. Selecting the mode for the creation of the point/point sequence connection statement makes it possible to enter points from a drawing by using the tablet. In other words, when one selects area $a_{13}$ to establish the mode for creation of the point-/point sequence connection statement, and then aligns the cursor with a prescribed position on a design drawing placed upon the tablet surface and presses the first switch SW1 (FIG. 6), an output of a point definition statement defining said position is produced. The point definition statement to be created will have the following format:

$$P_n = x, y$$

where n is a suffix number, namely a numerical value obtained by adding one (+1) to the suffix used in the point definition statement produced previously. The initial value of the suffix is one. Also, x, y are the X and Y coordinate values of the point.

Figure 10:
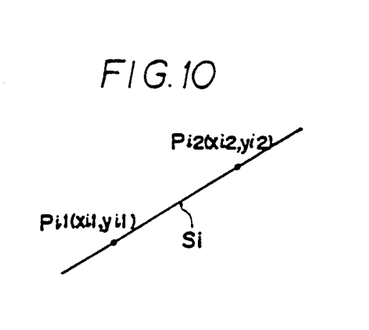
FIGS. 10 and 11 illustrate straight line and circular arc data inputs.

The mode for creation of the straight line definition statement is a mode in which a statement defining a straight line passing through two separately entered points is created and produced as an output. Selecting the mode for the creation of the straight line definition statement makes it possible to enter points from a drawing by using the tablet. In other words, when one selects area $a_{14}$ to establish the mode for creation of the straight line definition statement, and then aligns the cursor with a single point $P_{i1}$ on the tablet surface and presses the first switch SW1 or second switch SW2, followed by aligning the cursor with another point $P_{i2}$ and presses the first switch SW1 or second switch SW2, as shown in FIG. 10, a statement defining a straight line $S_i$ passing through the two points is created and produced as an output. The definition statement to be created will have the following format:

$$S_i = x_{i1}, y_{i1}; x_{i2}, y_{i2}$$

where i is a suffix which increases by one in the order of the straight line definition statements.

Figure 11:
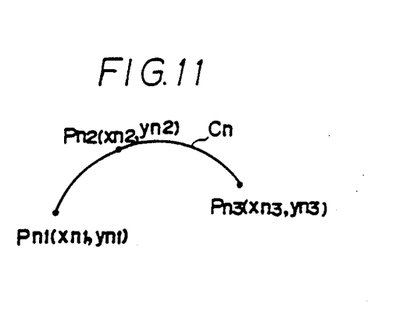

The mode for creation of the circular arc definition statement is a mode in which a statement defining a circular arc passing through three separately entered points is created and produced as an output. Selecting the mode for the creation of the circular arc definition statement makes it possible to enter points from a drawing by using the tablet. In other words, when one selects area $a_{16}$ to establish the mode for creation of the circular arc definition statement, and then aligns the cursor with a point $P_{n1}$ located on circular arc $C_n$ (FIG. 11) desired to be defined, followed by pressing the first switch SW1 or second switch SW2, and then repeats the procedure for two different points $P_{n2}$, $P_{n3}$ on the circular arc, a statement defining a circular arc passing through the three entered points is created and produced as an output. The definition statement to be created will have the following format:

$$C_n = x_{n1}, y_{n1}; x_{n2}, y_{n2}; x_{n3}, y_{n3}$$

Initially, the suffix numbers of the points, straight lines and circular arcs are initially one, with the suffix number being incremented each time a respective statement is created. When it is desired to restore a suffix number to one, the area $a_6$ is designated, whereupon the suffixes for all definition statements will be restored to one. If one then proceeds to define a graphic from that point onward, the suffixes will again be incremented starting from one.

In entering the data specifying the points $P_i$, straight lines $S_i$ and circular arcs $C_i$, one first presses the area $a_6$ to set the suffix number to "1". Next, points on the design drawing which correspond to the points $P_1$, $P_2$, ... displaced on the CRT are entered through the foregoing method, and the point data is stored in the data memory 21d (only point $P_1$ in the example illustrated in FIG. 8).

When the entry of data for the various points is completed, the straight lines on the design drawing which correspond to the straight lines $S_1$, $S_2$ ... displayed on the CRT are entered successively through the foregoing method and are likewise stored in the data memory 21d.

When the operation for specifying the various straight lines is completed, the circular arcs on the design drawing which correspond to the circular arcs $C_1$, $C_2$... displayed on the display unit are entered through the foregoing method and stored in the data memory 21d. This completes the entry of data specifying the points, straight lines and circular arcs that define a graphic. Note that the entry of the points, straight lines and circular arcs can be greatly simplified if the symbols for the points, straight lines and circular arcs to be entered next are made to blink on the display, and if each completion of an input operation for all points, all straight lines and all circular arcs is indicated on the display by way of a message.

When the input of a graphic definition is completed through the foregoing operations, the processor 21b goes to the motion statement memory 21a to call the motion definition statement associated with the graphic definition statement specified by the graphic identifier FN stored in the data memory 21d, and creates, in the memory 21f, a part program by combining the motion definition statement with the graphic definition statement stored in the data memory 21d. Note that while the foregoing is for a case where various motion definition statements have been stored in advance, it is also possible to create graphic definition statements using symbols of points, straight lines and circular arcs, with the data specifying these point, straight lines and circular arcs being left unspecified, and store a plurality of incomplete part programs for respective ones of various shapes, the incomplete part programs comprising these graphic definition statements and motion definition statements.

When a part program has been created through the foregoing operations, the processor executes NC data creation processing under the control of the control program. The following NC data is created by the part program [(a)-(q)] of FIG. 1:

| | |
|---|---|
| G92 X0. Y0. Z50. ; | (F) |
| G91 G00 $X_{x1}$ $Y_{y1}$ ; | (G) |
| G01 Z-40. F0100 S1500 ; | (H) |
| Z-10. F0050 ; | (I) |
| X$x_{12}$ Y$y_{12}$ ; | (J) |
| X$x_{23}$ Y$y_{23}$ ; | (K) |
| X$x_{34}$ Y$y_{34}$ ; | (L) |
| X$x_{41}$ Y$y_{41}$ ; | (M) |
| G00 Z50. ; | (N) |
| X0. Y0. ; | (P) |
| M02 ; | (Q) |

The blocks (F)–(Q) correspond to blocks (f)–(q) in the above-described part program. In the foregoing NC data, ($x_1$, $y_1$) are the coordinate values of the point $P_1$ in the XY plane, and ($X_{ij}$, $Y_{ij}$) are the coordinate values of the intersection between straight lines $S_i$ and $S_j$.

It should be noted that an arrangement is possible wherein a graphic definition statement created through the foregoing procedure is applied as an input to a separate apparatus, with an NC tape being created by the separate apparatus. For example, it can be arranged so that a graphic definition statement specifying a cross-sectional shape of a curved surface is created by the NC tape automatic creation apparatus shown in FIG. 7, the graphic definition statement is applied as an input to a curved surface generating apparatus, and a curved surface is generated in the curved surface generating apparatus from the graphic definition statement of the cross-sectional shape, thereby to create an NC tape for the curved surface. Processing efficiency can be improved by thus performing decentralized processing.

According to the present invention, a part program can be created merely by storing motion definition statements and the like based on various shapes, and combining these motion statements with created graphic definition statements. Accordingly, the present invention greatly reduces the time required for part program creation and makes it possible for a part program and an NC tape to be simply created even by beginners.

What is claimed is:

1. A part program creation method for creating an NC part program in an apparatus having a memory, a graphic input device and a display unit, the program comprising a graphic definition statement defining a graphic, a motion definition statement defining a tool path including auxiliary machining information including feed velocity and spindle rotational velocity, said method comprising the steps of:
  (a) storing in the memory a plurality of motion definition statements, each statement associated with a corresponding shape;
  (b) defining a graphic using a graphic input device to generate a defined graphic definition statement correpsonding to an associated motion statement among the plurality of motion definition statements, by performing at least two of:
    (i) specifying a point of the graphic,
    (ii) specifying two points defining a straight line of the graphic,
    (iii) specifying three points on a circular arc of the graphic, wherein said three points have coordinates defining a location in an orthogonal coordinate system;
  (c) creating a part program comprising the defined graphic definition statement and the associated motion statement;
  (d) entering an identifier corresponding to the associated motion statement and to the defined graphic definition statement;
  (e) storing in the memory image information for tool path patterns defined by the motion definition statements;
  (f) displaying a selected tool path pattern, defined by the associated motion statement, on the display unit in dependence upon the image information for the selected tool path pattern; and
  (g) displaying on the display unit a predetermined element from among a point, a straight line and a circular arc, to be entered next.

2. A part program creation method for creating an NC part program in an apparatus having a memory and a graphic input device, the program comprising a graphic definition statement defining a graphic, a motion definition statement defining a tool path, and auxiliary machining information including feed velocity and spindle rotational velocity, said method comprising the steps of:
  (a) defining a graphic definition statement using symbols representing points, straight lines and circular arcs, without specifying data corresponding to the points, straight lines and circular arcs;
  (b) storing in the memory an incomplete part program comprising said graphic definition statement and an associated motion definition statement;
  (c) specifying the data corresponding to each of the points, straight lines and circular arcs using the graphic input device; and
  (d) creating a complete part program by using the data corresponding to the points, straight lines and circular arcs, said graphic definition statement and said associated motion definition statement.

3. A part program creation method according to claim 1, further comprising the steps of:
  (e) storing in the memory, a program identifier corresponding to said incomplete part program and to a tool path pattern; and
  (f) retrieving said incomplete part program in response to input of the program identifier.

4. A part program creation method according to claim 3, wherein said apparatus has a display unit and said method further comprises the steps of:
  (g) storing in the memory image information representing the tool path pattern corresponding to the program identifier and said incomplete part program;
  (h) displaying the tool path pattern on the display unit on the basis of the image information; and
  (i) displaying on the display unit in sequence, each of the symbols representing one of the points, straight lines and circular arcs which is to be specified using the graphic input device.

5. A part program creation method according to claim 3, wherein said graphic input device comprises a table device and step (c) comprises digitizing coordinate data of a drawing on the tablet device.

* * * * *

UNITED STATES PATENT AND TRADEMARK OFFICE
CERTIFICATE OF CORRECTION

PATENT NO. :        4,660,148
DATED     :         April 21, 1987
INVENTOR(S) :       Kishi et al.

It is certified that error appears in the above-identified patent and that said Letters Patent is hereby corrected as shown below:

Column 3, line 17, "50A" should be --50Z--.
Column 10, line 21, "claim 1" should be --claim 2--.

Signed and Sealed this

Twenty-fifth Day of August, 1987

Attest:

DONALD J. QUIGG

Attesting Officer       Commissioner of Patents and Trademarks